US008074267B1

(12) United States Patent
Stimpson

(10) Patent No.: US 8,074,267 B1
(45) Date of Patent: Dec. 6, 2011

(54) COMPUTER COMMUNICATIONS MONITOR

(75) Inventor: Michael S. Stimpson, Riverton, UT (US)

(73) Assignee: Symantec Corporation, Mountain View, CA (US)

( * ) Notice: Subject to any disclaimer, the term of this patent is extended or adjusted under 35 U.S.C. 154(b) by 1154 days.

(21) Appl. No.: 10/741,423

(22) Filed: Dec. 18, 2003

(51) Int. Cl.
*G06F 9/00* (2006.01)
*G06F 15/16* (2006.01)
*G06F 17/00* (2006.01)

(52) U.S. Cl. ............... 726/13; 726/11; 726/12; 726/14; 713/151; 713/154; 713/160; 713/168

(58) Field of Classification Search .............. 726/11–14; 713/151, 160, 154, 168
See application file for complete search history.

(56) References Cited

U.S. PATENT DOCUMENTS

| 5,935,245 | A  | * | 8/1999 | Sherer .............................. 726/13 |
| 6,170,057 | B1 | * | 1/2001 | Inoue et al. .................... 713/153 |
| 6,253,321 | B1 | * | 6/2001 | Nikander et al. .............. 713/160 |
| 6,735,701 | B1 | * | 5/2004 | Jacobson .......................... 726/1 |
| 7,093,288 | B1 | * | 8/2006 | Hydrie et al. .................... 726/13 |
| 7,165,100 | B2 | * | 1/2007 | Cranor et al. .................. 709/223 |
| 2002/0093527 | A1 | * | 7/2002 | Sherlock et al. .............. 345/736 |
| 2002/0129140 | A1 | * | 9/2002 | Peled et al. .................... 709/224 |
| 2002/0129243 | A1 | * | 9/2002 | Nanjundiah .................... 713/160 |
| 2003/0014644 | A1 | * | 1/2003 | Burns et al. .................... 713/182 |
| 2003/0018891 | A1 | * | 1/2003 | Hall et al. ...................... 713/160 |
| 2003/0200456 | A1 | * | 10/2003 | Cyr et al. ....................... 713/200 |
| 2004/0151308 | A1 | * | 8/2004 | Kacker et al. .................... 380/30 |
| 2004/0168050 | A1 | * | 8/2004 | Desrochers et al. .......... 713/153 |
| 2005/0076228 | A1 | * | 4/2005 | Davis et al. .................... 713/188 |

OTHER PUBLICATIONS

Anon, Independent Verification of IPsec Functionality Under Free BSD 3.0 http://www.geocities.com/SiliconValley/Code/4704/ipsecmust.html, Oct. 24, 2003.
Litvinov, Semyon, et al, "Using a Packet Sniffer to Analyze the Efficiency and Power of Encryption Techniques Used to Protect Data Over a Computer Network", Statistics Department/MCS Program, St. Cloud State University.
Shamir, Adi, et al, "Playing hide and seek with stored keys", Sep. 22, 1998, http://www.cipher.com/resources/downloads/files/whitepapers/keyhide2.pdf.
"Sniffit-packet sniffer and monitoring tool", Manual Page, found at http://reptile.rug.ac.be/~coder/sniffit/sniffit.manpage.8.html.
"WinPcap Documentation", the NetGroup at Politecnico, di Torino, found at http://wincap.polito.it/docs/docs31beta2/html/main.html.
Martin Roesch: *Snort-Lightweight Intrusion Detection for Networks*, Proceedings of *LISA* '99: 13th Systems Administration Conference, Seattle Washington, Nov. 7-12, 1999; pp. 229-238.

(Continued)

*Primary Examiner* — Edan Orgad
*Assistant Examiner* — Kari Schmidt
(74) *Attorney, Agent, or Firm* — Wilmer Cutler Pickering Hale and Dorr LLP

(57) ABSTRACT

A method for monitoring computer communications is disclosed. A packet sent from a sending node to a destination node is received at a monitoring node. It is determined whether the packet is encrypted.

44 Claims, 7 Drawing Sheets

OTHER PUBLICATIONS

Martin Roesch, Chris Green: *Snort Users Manual—Snort Release*: 2.0.0: Apr. 8, 2003.

Raytheon, *About SilentRunner®*. Formerly at http://www.silentrunner.com/images/pdf/product2.pdf as of Feb. 20, 2003 as indicated by the web.archive.org page from which reference was downloaded.

Raytheon, *SilentRunner® Product FAQ*. Formerly at http://www/silentrunner.com/silentrunner/products/product.faq.html as of Mar. 10, 2003 and unchanged and still available Aug. 22, 2003, as indicated by the dale portion of URL of web.archive.org page from which reference was downloaded.

* cited by examiner

COMPUTER COMMUNICATIONS MONITOR

FIELD OF THE INVENTION

The present invention relates generally to computer communications. More specifically, a computer communications policy monitor is disclosed.

BACKGROUND OF THE INVENTION

Encryption technology may be used to make communications sent over a computer network, such as the Internet, more secure by preventing unauthorized users from viewing the true underlying data even if they were able to intercept the communication. In some cases, an enterprise or other entity may wish to require that certain communications be sent using encryptions and/or that others be sent in unencrypted form. For example, a company may desire that highly sensitive data be sent using encryption, but that routine communications be sent in unencrypted form, e.g., to avoid the overhead associated with encrypted communications.

An enterprise or other entity may choose to adopt express policies regarding which types of network communications should be encrypted. However, currently available technology does not provide an effective and convenient way to verify compliance with such policies. Therefore, there is a need for an efficient way to determine whether network communications are encrypted and based on that determination evaluate whether a particular communication conforms to an applicable encryption policy.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1A:
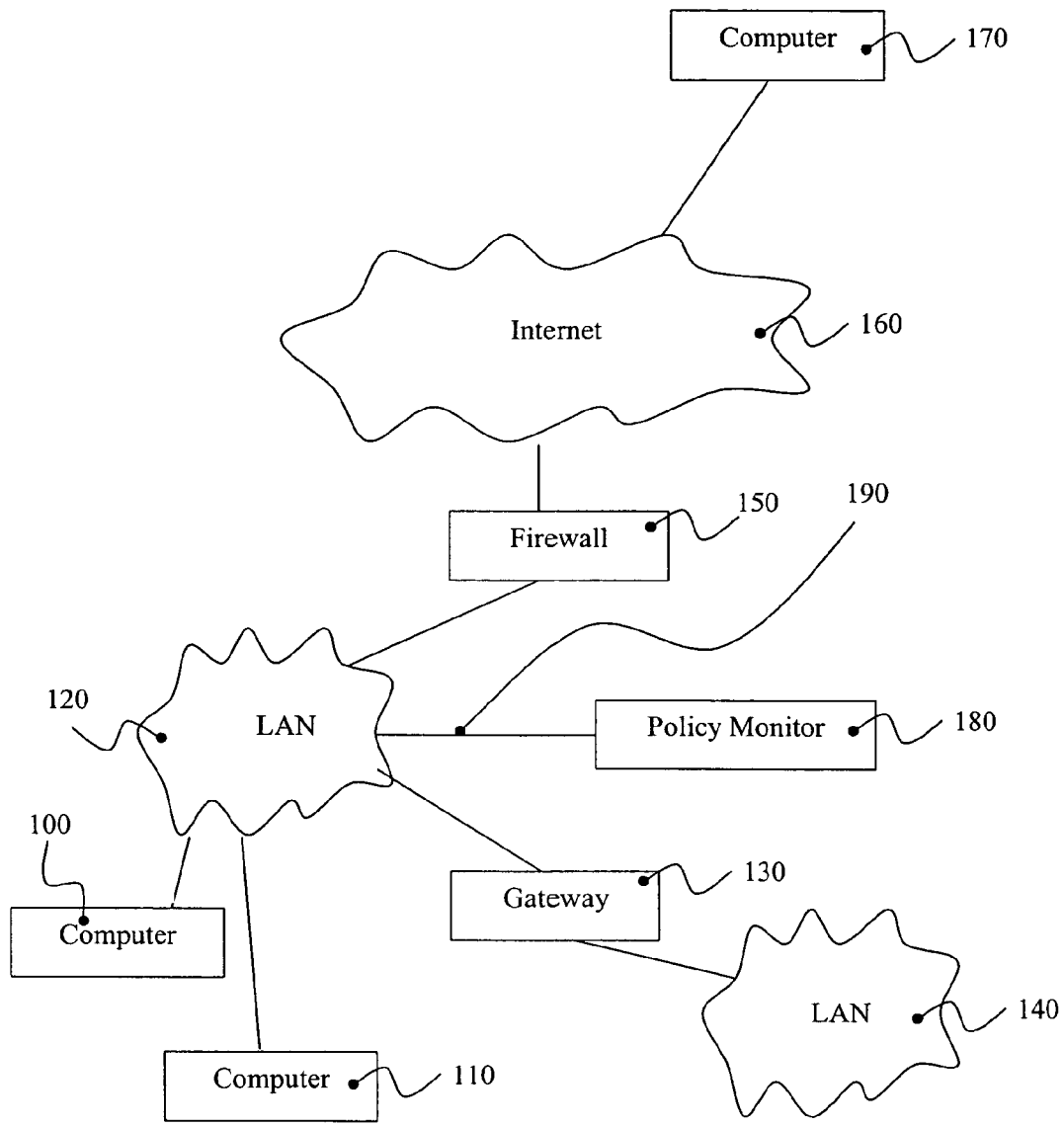
FIG. 1A is a block diagram showing one embodiment of a computer communications policy monitor.

FIG. 1A is a block diagram showing one embodiment of a computer communications policy monitor. The diagram shows computers 100 and 110 connected to LAN 120. LAN 120 is connected to gateway 130. Gateway 130 is also connected to LAN 140. LAN 120 is also connected to firewall 150, which is connected to the Internet 160. Computer 170 is connected to the Internet 160. Policy monitor 180 is connected to LAN 120 through connection 190. Policy monitor 180 may include a network sniffer that listens to packet traffic in LAN 120. In some embodiments, the communications interface to the policy monitor may be a network interface (e.g. card, chip, circuit or any other interface) in promiscuous mode. The encryption policy may be such that all communications in LAN 120 are encrypted. The encryption policy may be such that only the communications from a specific source IP address and/or to a particular destination IP address in LAN 120 are encrypted. The encryption policy may be such that only specific types of communications, secret, financial, or medical, are encrypted. The encryption policy may require that communications to or from and/or between systems of a certain type or class, e.g., in the military context those systems and/or connections not specially configured to block electronic eavesdropping, be encrypted and that all others not be encrypted. Such encryption policies may be imposed as a function of user preferences, business needs, national security or other governmental needs, regulatory requirements, privacy concerns, and/or any combination of these and/or other considerations.

Figure 1B:
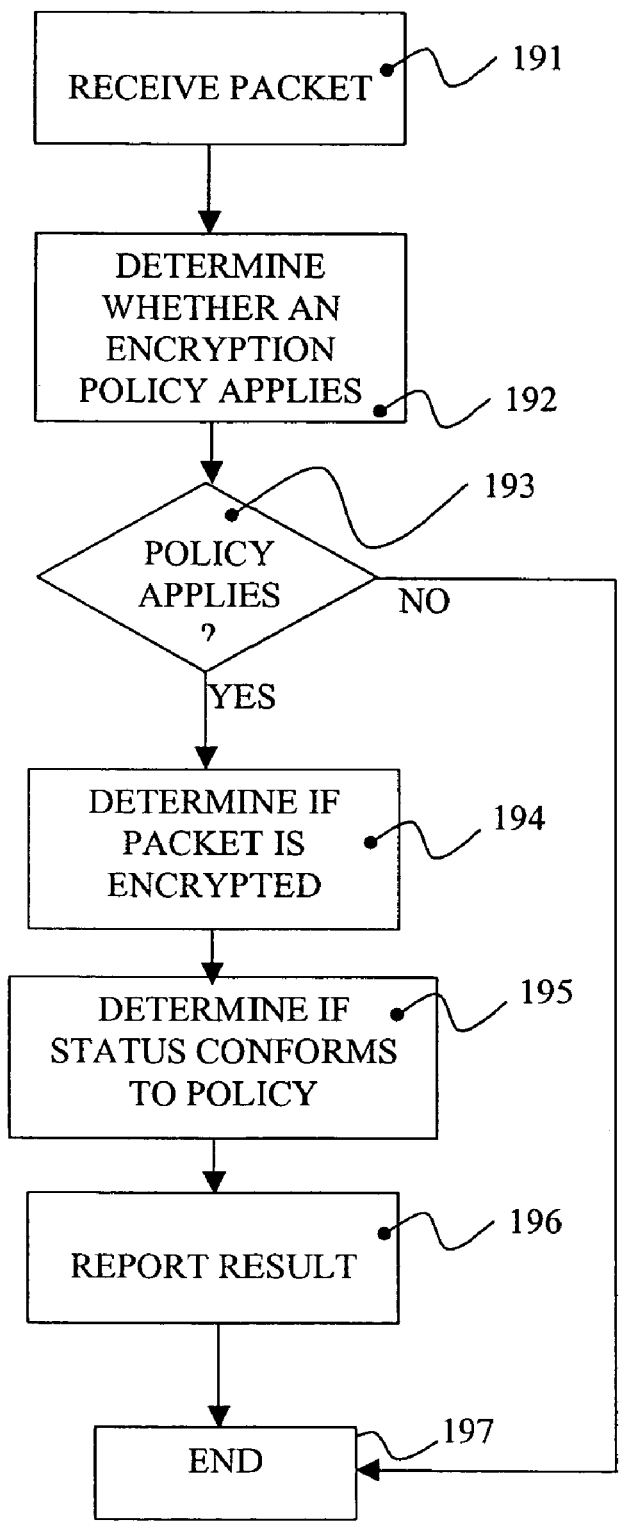
FIG. 1B is a flow chart illustrating a process used in some embodiments to monitor compliance with a communications policy.

FIG. 1B is a flow chart illustrating a process used in some embodiments to monitor compliance with a communications policy. In some embodiments, the policy monitor 180 of FIG. 1A may be used to implement all or part of the process shown in FIG. 1B. The process illustrated in FIG. 1B begins in step 191, in which a packet is received. In step 192, it is determined whether an encryption policy applies to the packet. In some embodiments, packet header information, such as the source address, source port, destination address, and/or destination port may be used to determine whether an encryption policy applies to the packet. For example, a policy may require that communications to a particular destination or class of destinations be encrypted (or not), or that communications sent via a particular service associated with a designated port number be encrypted (or not). In some embodiments, other data may be used to determine whether an encryption policy applies to a packet. If it is determined in step 192 that no encryption policy applies to the packet, the process proceeds via step 193 to step 197, in which the process ends. This approach may conserve resources and/or otherwise improve performance in some embodiments by avoiding the performance of the remaining steps of the process shown in FIG. 1B with respect to packets to which no encryption policy applies. In some embodiments, steps 192 and 193 may be omitted and the remaining steps of the process shown in FIG. 1B may be performed with respect to all packets received by the policy monitor. If it is determined in step 192 that an encryption policy applies to the packet, the process proceeds via step 193 to step 194, in which it is determined whether the packet is encrypted. In some embodiments, step 194 may comprise performing an entropy-based statistical analysis to determine whether the packet contains encrypted data. Such analysis is based on the fact that encrypted data typically exhibits higher entropy that unencrypted data, since one of the objectives of encryption is to make it difficult if not impossible to break the code based, e.g., on the knowledge that certain characters typically occur with greater or lesser frequency than other characters in the applicable language. The principles on which such entropy-based statistical analysis is based on Claude Shannon's 1948 Bell Labs work, as described for example in C. E. Shannon, *A mathematical theory of communication*, Bell System Technical Journal, vol. 27, pp. 379-423 and 623-656, July and October, 1948, which is incorporated herein by reference for all purposes. A quicker approach that approximates the Shannon techniques for performing such analysis are described, for example and without limitation, in the article entitled, *Playing Hide and Seek with Stored Keys*, by Adi Shamir and Nicko van Someren, dated Sep. 22, 1998 and available on the Internet at http://www.ncipher.com/resources/downloads/files/whitepapers/keyhide2.pdf, which is incorporated herein by reference for all purposes. In step 195, it is determined whether the encrypted or not encrypted status as determined in step 194 satisfies the applicable encryption policy. In some embodiments, step 195 is omitted. In step 196, a report is generated. In some embodiments, the report may comprise an indication as to the encrypted or not encrypted status of the packet. In some embodiments, the report may comprise an indication as to whether or not the encrypted or not encrypted status of the packet, as applicable, satisfies the policy as determined in step 195. The report may comprise a computer-generated report, such as a table, spreadsheet, or log; an alert; an indication displayed via a user interface; a database entry, or any indication of a result of any aspect of the analysis described herein. In some embodiments, steps 192, 193, and 195 may be omitted and no determination is made via the process shown in FIG. 1B as to whether an encryption policy applies or as to whether the encrypted or not encrypted status of the packet satisfies such a policy.

Figure 2:
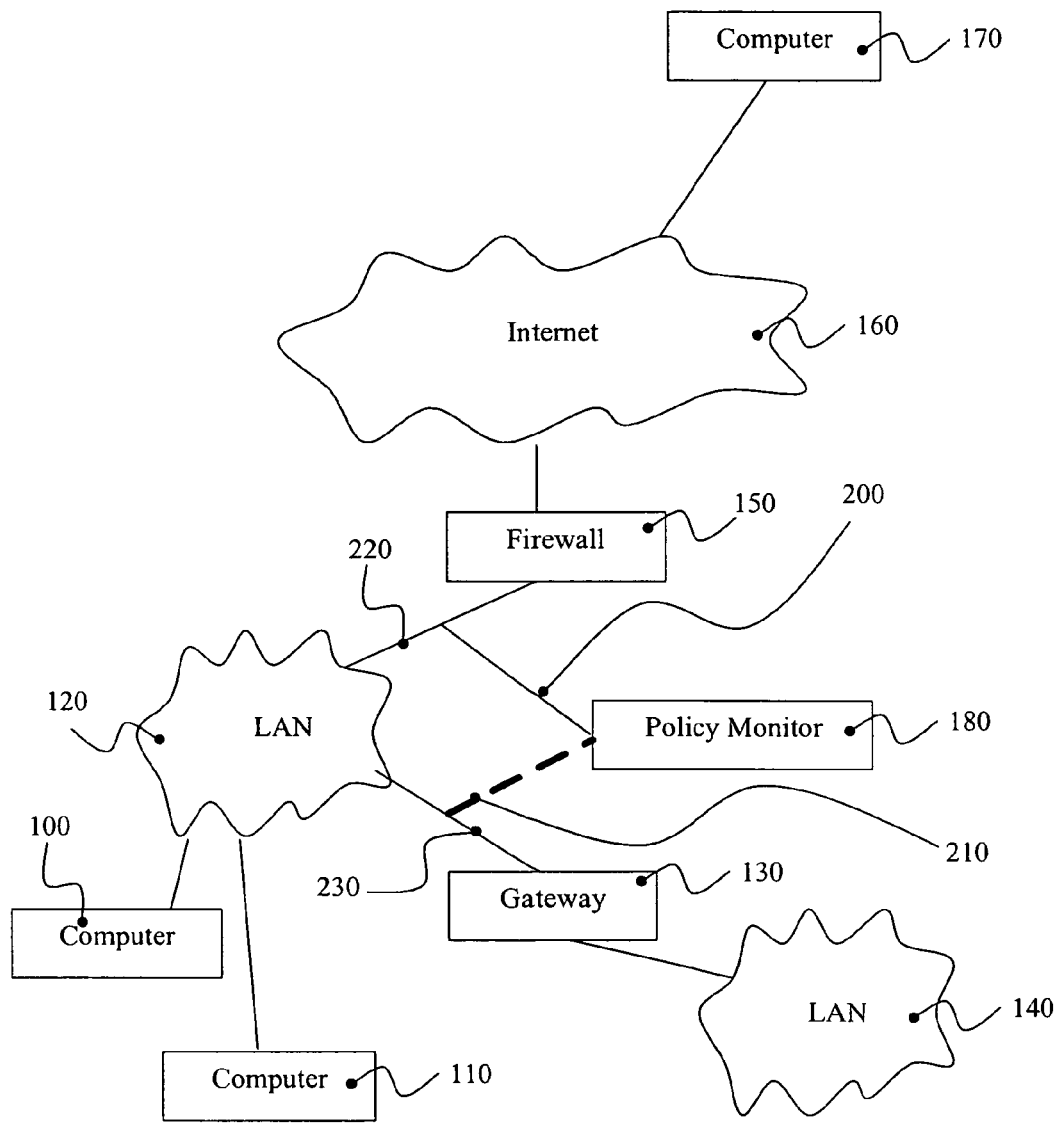
FIG. 2 is a block diagram showing one embodiment of a computer communications policy monitor.

FIG. 2 is a block diagram showing one embodiment of a computer communications policy monitor. The diagram shows computers 100 and 110 connected to LAN 120. LAN 120 is connected via link 230 to gateway 130. Gateway 130 is also connected to LAN 140. LAN 120 is also connected via link 220 to firewall 150, which is connected to the Internet 160. Computer 170 is connected to the Internet 160. Policy monitor 180 may be connected by connection 200 to the link 220 between LAN 120 and firewall 150, as shown in FIG. 2. A policy monitor connected in this manner can be used to monitor policy compliance with respect to communication between nodes on LAN 120 and external domains, such as the Internet 160. Such a configuration may be used, for example, in an application in which one or more encryption policies apply to communications with external domains but the enterprise is indifferent with respect to whether communication between nodes on LAN 120 or between LAN 120 and LAN 140 are encrypted.

In some embodiments, policy monitor 180 is a FPGA or ASIC device that processes the packet traffic to determine if each packet conforms to an encryption policy. In other embodiments, the policy monitor 180 may comprise a computer or other general purpose processor configured to perform the functions of the policy monitor 180 as described herein, such as by running software comprising computer instructions for performing the functions of the policy monitor 180 as described herein.

Policy monitor 180 may optionally be connected by connection 210 to the link 230 between LAN 120 and gateway 130. In this alternate configuration the policy monitor could monitor communication between LAN 120 and LAN 140. In some embodiments, the encryption policy may require certain or all communications be encrypted. Policy monitor 180 may include a network sniffer that listens to packet traffic on link 220 and/or link 230. In some embodiments, the communications interface to the policy monitor may be a network interface (e.g. card, chip, circuit, or other interface) in promiscuous mode.

Figure 3:
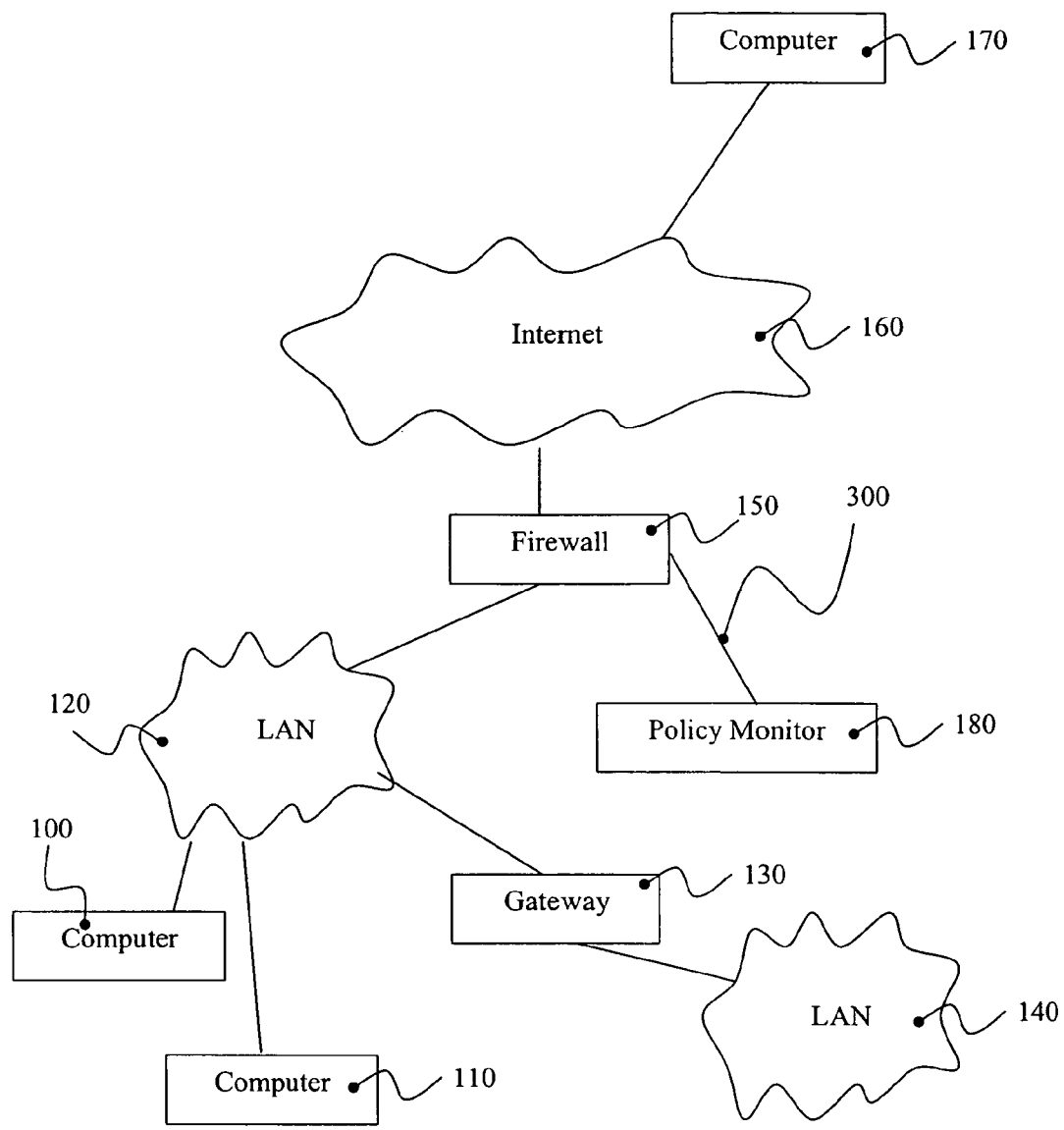
FIG. 3 is a block diagram showing one embodiment of a computer communications policy monitor.

FIG. 3 is a block diagram showing one embodiment of a computer communications policy monitor. The diagram shows computer 100 and 110 connected to LAN 120. LAN 120 is a connected to gateway 130. Gateway 130 is also connected to LAN 140. LAN 120 is also connected to firewall 150, which is connected to the Internet 160. Computer 170 is connected to the Internet 160. In this embodiment, policy monitor 180 is connected to firewall 150. The policy monitor 180 receives via connection 300 a copy of the packets passing through firewall 150. In some embodiments, policy monitor 180 receives packets from firewall 150 by operation of a copy port process on firewall 150 by which a copy of each packet received by firewall 150 on a particular port is sent to the policy monitor 180 via connection 300. In some embodiments, computer 170 communicates via the Internet 160 through firewall 150 with LAN 120. In some embodiments, all communications between LAN 120 and computer 170 are encrypted using a virtual private network system. Policy monitor 180 via connection 300 can monitor these communications between LAN 120 and computer 170. The encryption policy may be such that only sensitive data is encrypted as for example secret data in military or government communications. For example, the encryption policy may require that patient medical data or financial data be encrypted.

Figure 4:
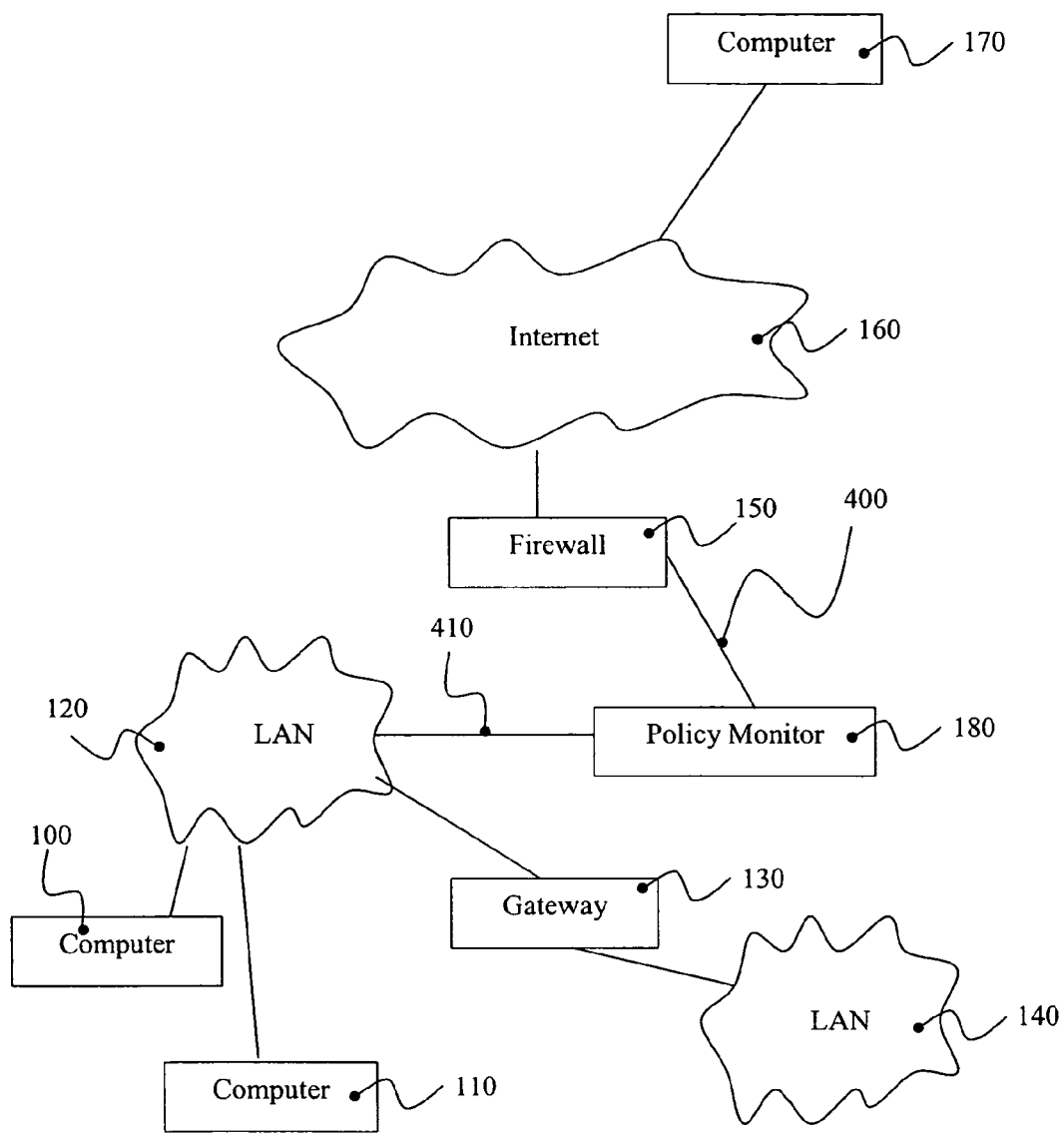
FIG. 4 is a block diagram showing one embodiment of a computer communications policy monitor.

FIG. 4 is a block diagram showing one embodiment of a computer communications policy monitor. The diagram shows computers 100 and 110 connected to LAN 120. LAN 120 is connected to gateway 130. Gateway 130 is also connected to LAN 140. LAN 120 is also connected to the Internet 160 via connection 410, policy monitor 180, connection 400, and firewall 150. Computer 170 is connected to the Internet 160. In some embodiments, the policy monitor 180 acts as an interface between a first network and a second network. The policy monitor 180 receives the packets passing from LAN 120 through connection 410. Policy monitor 180 then sends the packets on to firewall 150 through connection 400 In some embodiments, the policy monitor removes a packet from the packet traffic if the encrypted or not encrypted status of the packet does not satisfy the encryption policy.

Figure 5:
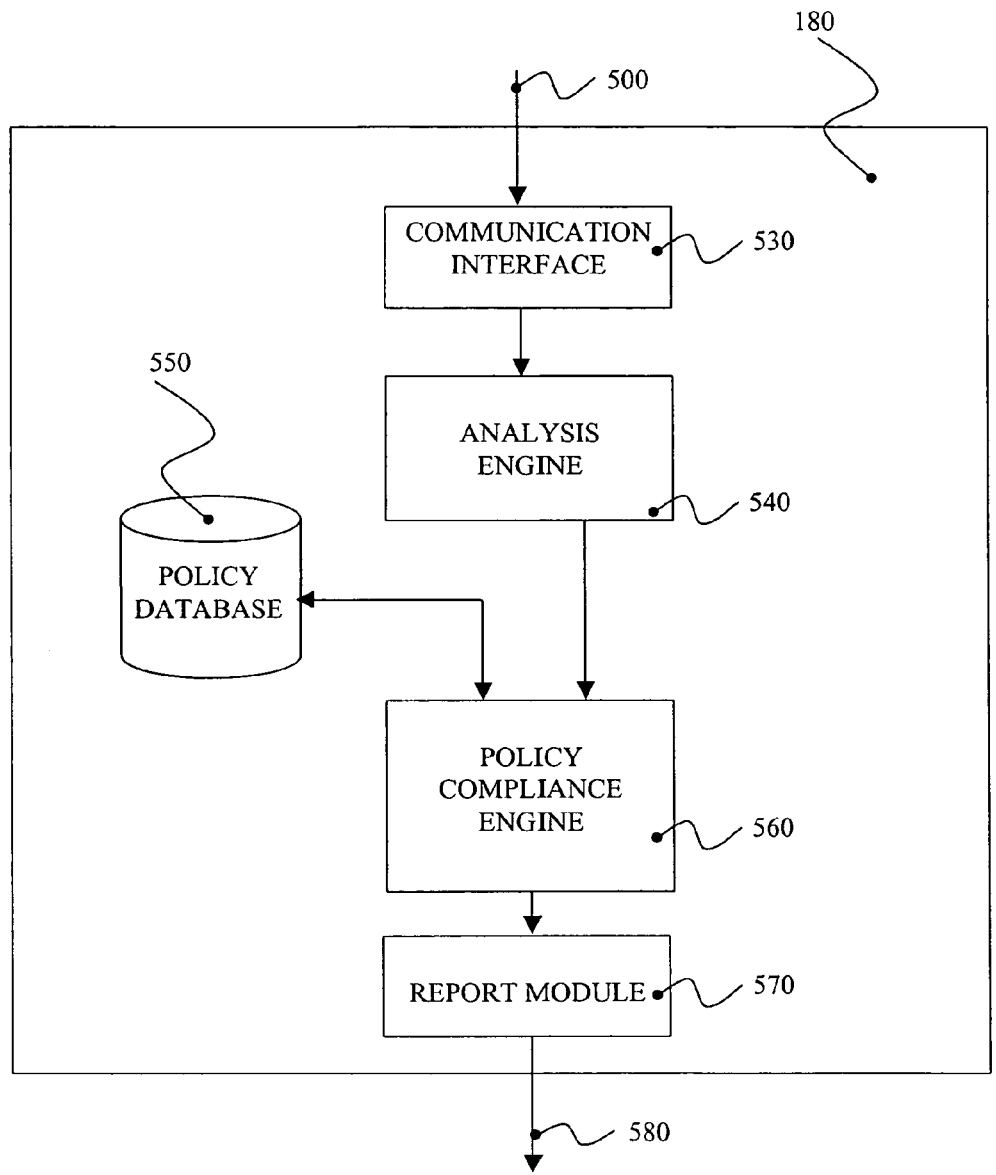
FIG. 5 is a block diagram showing a policy monitor for computer communications used in some embodiments.

FIG. 5 is a block diagram showing a policy monitor for computer communications used in some embodiments. The policy monitor has an interface 530 (a first node) configured to receive packets via an input connection 500. In some embodiments, the connection 500 is receiving packets that are sent from a second node to a third node within a network (e.g. a LAN), along a connection, or from a copy port of a device. The packets are then passed on to an analysis engine 540 configured to determine whether the packet is encrypted. In one embodiment, the analysis engine determines whether the packet is encrypted using statistical analysis. In some embodiments, this analysis is an entropy calculation. In some embodiments, the packet is decoded before the packet is analyzed. In some embodiments, the decoding is UUdecoding the packet. In some embodiments, the decoding is a decompression decoding. In some embodiments, the decompression decoding is zip decoding or gzip decoding. In some embodiments, the decoding is tar decoding.

Analysis engine 540 passes its determination on to policy compliance engine 560, which in one embodiment compares this determination with one or more applicable policies stored in a policy database 550. The policy database 550 stores the encryption policy, which includes in some embodiments a criterion for when a packet should be encrypted, a criterion for when a packet should not be encrypted, or a plurality of criteria each identifying a class of packet that either should or should not be encrypted.

In some embodiments, the policy compliance engine 560 may determine whether an encryption policy applies to a packet by determining whether a policy applies to communications between the source node from which the packet was sent and the destination node to which it was sent. In some embodiments, the policy compliance engine 560 may determine whether an encryption policy applies to a packet by determining whether a policy applies to communications between the source node from which the packet was sent and a class of destinations. In some embodiments, the policy compliance engine 560 may determine whether an encryption policy applies to a packet by determining whether a policy applies to communications between a class of sources from which the packet was sent and a class of destinations. In some embodiments, the policy compliance engine 560 may determine whether an encryption policy applies to a packet by determining whether a policy applies to communications between a class of source interfaces (e.g. ports) from which the packet was sent and a class of destination interfaces (e.g. ports). In some embodiments, the policy compliance engine 560 may determine whether an encryption policy applies to a packet by determining whether a policy applies to communications from a particular source or to a particular destination. In some embodiments, the policy compliance engine 560 may determine whether under an applicable policy the packet is required to be encrypted and may compare the actual encrypted or not encrypted status of the packet with the status required by the policy. In addition, the policy compliance engine 560 may provide an indication of whether the encrypted or not encrypted status of the packet satisfies the encryption policy. In some embodiments, this indication is received by a report module 570, which generates output data based on the indication and provides the output data as output on output connection 580. In some embodiments, the output provided by the report module 570 is in the form of a report. In some embodiments, the output is an entry in a database. In some embodiments, the output is in the form of a status displayed using a graphical user interface. In some embodiments, the report module 570 may be configured to generate an alert when a policy violation is found. In some embodiments, the report module may not be included. In such an embodiment, the user or a third party might provide a report module.

While FIG. 5 shows the elements 530, 540, 550, 560, and 570 as comprising a single device 180, those of ordinary skill in the art will recognize that one or more of these components may instead be provided in or on a separate device, such as a separate computer, processor, memory, storage device, a circuit in an FPGA, a circuit in an ASIC, or other integrated circuit, as applicable, with a suitable communication link being provided to permit communication as required between the various elements of the policy monitor. For example, and without limitation, the policy database 550 in some embodiments may be provided in a memory or storage device separate form the other components shown in FIG. 5. Likewise, the policy compliance engine 560 and/or the report module 570 may be provided in a separate system and/or device from the analysis engine 540. In some embodiments, the report module may not be included. In such embodiments, the user or a third party might provide a report module.

Figure 6:
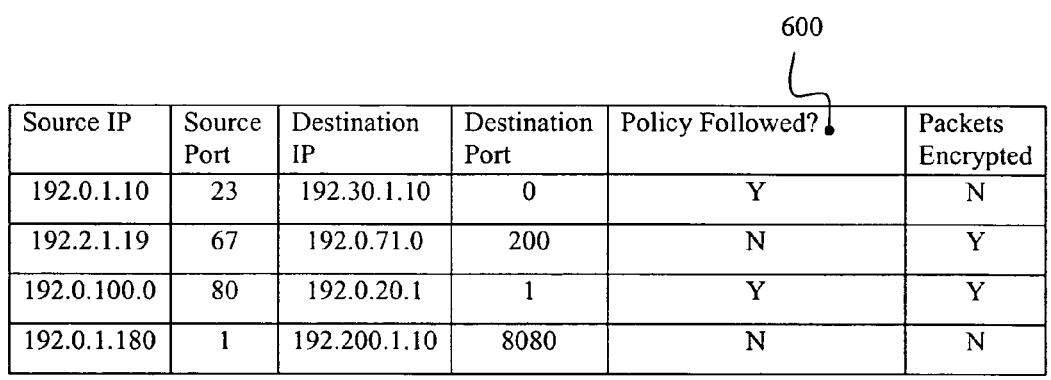
FIG. 6 shows one example of output from the report module 570.

FIG. 6 shows one example of output from the report module 570. The table 600 shows for each packet analyzed the source IP address, source port number, destination IP address, destination port number, and whether the policy was followed. In some embodiments, the table includes a session or connection identifier. In some embodiments, the table includes an indication of whether the packet is encrypted. In some embodiments, the table includes an indication of what the encryption policy is. In some embodiments, the table includes an indication of whether the packet is encoded or compressed. In some embodiments, the table indicates whether the packet is encrypted.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for monitoring computer communications comprising:
   receiving at a first node via a network communication interface a packet sent from a second node to a third node;
   determining whether an encryption policy applies to the packet sent from the second node to the third node based at least in part on packet header information in the packet;
   determining whether the packet includes a type of content for which the encryption policy requires that the content be encrypted or if the encryption policy does not require that the content be encrypted;
   determining whether the packet satisfies an encryption policy by determining whether an encryption policy applies to packets sent from a class of sources of which the second node is a member to a class of destinations of which the third node is a member;
   determining if the packet is encrypted, wherein determining if the packet is encrypted comprises performing an entropy-based statistical analysis of the packet; and
   generating a report indicating whether the encrypted or not encrypted status of the packet satisfies the encryption policy.

2. The method for monitoring computer communications as in claim 1 wherein receiving comprises listening on a network in promiscuous mode.

3. The method for monitoring computer communications as in claim 1 wherein receiving comprises listening on an interface to an access node linking a first network to a second network.

4. The method for monitoring computer communications as in claim 1 wherein receiving comprises receiving a copy of packets sent on an interface to an access node linking a first network to a second network.

5. The method for monitoring computer communications as in claim 1 wherein receiving comprises acting as an interface between a first network and a second network.

6. The method for monitoring computer communications comprising as in claim 1, wherein the first node and the second node are part of a same system.

7. The method for monitoring computer communications comprising as in claim 1, wherein the first node and the third node are part of a same system.

8. The method for monitoring computer communications comprising as in claim 1, wherein the first node, the second node, and the third node are part of a same system.

9. The method for monitoring computer communications as in claim 1 further comprising first decoding the packet's encoding.

10. The method for monitoring computer communications as in claim 9 wherein the encoding is UUencoding.

11. The method for monitoring computer communications as in claim 9 wherein the encoding is a compression encoding.

12. The method for monitoring computer communications as in claim 11 wherein the compression encoding is zip encoding.

13. The method for monitoring computer communications as in claim 11 wherein the compression encoding is gzip encoding.

14. The method for monitoring computer communications as in claim 11 wherein the compression encoding is tar encoding.

15. The method for monitoring computer communications as in claim 1 further comprising determining whether the packet satisfies an encryption policy by determining whether an encryption policy applies to packets sent from the second node to a class of destinations of which the third node is a member.

16. The method for monitoring computer communications as in claim 1 further comprising determining whether the packet satisfies an encryption policy by determining whether an encryption policy applies to packets sent to the third node from a class of sources of which the second node is a member.

17. The method for monitoring computer communications as in claim 1 further comprising determining whether the packet satisfies an encryption policy by determining whether an encryption policy applies to packets sent from a class of source ports of which the source port used by the second node to send the packet is a member.

18. The method for monitoring computer communications as in claim 1 further comprising determining whether the packet satisfies an encryption policy by determining whether an encryption policy applies to packets sent to a class of destination ports of which the destination port to which the packet is being sent is a member.

19. The method for monitoring computer communications as in claim 1 further comprising determining whether the packet satisfies an encryption policy by determining whether an encryption policy applies to packets sent from the source port used by the second node to send the packet.

20. The method for monitoring computer communications as in claim 1 further comprising determining whether the packet satisfies an encryption policy by determining whether an encryption policy applies to packets sent to the destination port to which the packet was sent.

21. The method for monitoring computer communications as in claim 1 further comprising determining whether the packet satisfies an encryption policy by a method comprising:
    determining whether under an applicable policy the packet is required to be encrypted; and
    if the packet is required under an applicable policy to be encrypted:
        comparing the actual encrypted or not encrypted status of the packet to the requirement;
        concluding that the packet satisfies the policy if it is encrypted; and
        concluding that the packet does not satisfy the policy if it is not encrypted.

22. The method for monitoring computer communications as in claim 1 further comprising determining whether the packet satisfies an encryption policy by a method comprising:
    determining whether under an applicable policy the packet is required to not be encrypted; and
    if the packet is required under an applicable policy to not be encrypted:
        comparing the actual encrypted or not encrypted status of the packet to the requirement;
        concluding that the packet satisfies the policy if it is not encrypted; and
        concluding that the packet does not satisfy the policy if it is encrypted.

23. The method for monitoring computer communications as in claim 1 wherein the report indicating whether the encrypted or not encrypted status of the packet satisfies the encryption policy is in the form of a status displayed using a graphical user interface.

24. The method for monitoring computer communications as in claim 1 wherein the report indicating whether the encrypted or not encrypted status of the packet satisfies the encryption policy is in the form of a database entry.

25. The method for monitoring computer communications as in claim 1 wherein the report indicating whether the encrypted or not encrypted status of the packet does not satisfy the encryption policy is in the form of an alert.

26. The method for monitoring computer communications as in claim 1 further comprising providing an indication of the encrypted or not encrypted status of the packet.

27. The method for monitoring computer communications as in claim 26 wherein the indication of the encrypted or not encrypted status of the packet is in the form of a report.

28. The method for monitoring computer communications as in claim 26 wherein the indication of the encrypted or not encrypted status of the packet is in the form of a status displayed using a graphical user interface.

29. The method for monitoring computer communications as in claim 26 wherein the indication of the encrypted or not encrypted status of the packet is in the form of a database entry.

30. The method for monitoring computer communications as in claim 26 wherein the indication of the encrypted or not encrypted status of the packet is in the form of an alert.

31. The method for monitoring computer communications as in claim 1 further comprising determining whether the packet satisfies an encryption policy wherein the encryption policy comprises a criterion for when a packet should be encrypted.

32. The method for monitoring computer communications as in claim 1 further comprising determining whether the packet satisfies an encryption policy wherein the encryption policy comprises a criterion for when a packet should not be encrypted.

33. The method for monitoring computer communications as in claim 1 further comprising determining whether the packet satisfies an encryption policy wherein the encryption policy comprises a plurality of criteria, each identifying a class of packet that either should or should not be encrypted.

34. The method for monitoring computer communications as in claim 1 further comprising removing the packet from the packet traffic if the encrypted or not encrypted status of the packet does not satisfy an encryption policy.

35. A device for monitoring computer communications comprising:
   a communications interface for receiving at a first node a packet sent from a second node to a third node, and
   an analysis engine for:
      determining whether an encryption policy applies to the packet sent from the second node to the third node based at least in part on packet header information in the packet;
      determining whether the packet includes a type of content for which the encryption policy requires that the content can be encrypted or if the encryption policy does not require that the content be encrypted;
      determining whether the packet satisfies an encryption policy by determining whether an encryption policy applies to packets sent from a class of sources of which the second node is a member to a class of destinations of which the third node is a member;
      determining if the packet is encrypted, wherein determining if the packet is encrypted comprises performing an entropy-based statistical analysis of the packet; and
      generating a report indicating whether the encrypted or not encrypted status of the packet satisfies the encryption policy.

36. The device for monitoring computer communications as in claim 35 wherein the communication interface comprises a network interface in promiscuous mode.

37. The device for monitoring computer communications as in claim 35 wherein the analysis engine comprises a circuit in an FPGA.

38. The device for monitoring computer communications as in claim 35 wherein the analysis engine comprises a circuit in an ASIC.

39. The device for monitoring computer communications as in claim 35 wherein the analysis engine comprises an analysis program running on a processor.

40. The device for monitoring computer communications as in claim 35 further comprising a policy compliance engine for determining whether the packet satisfies an encryption policy.

41. The device for monitoring computer communications as in claim 40 wherein the policy compliance engine comprises a circuit in an FPGA.

42. The device for monitoring computer communications as in claim 40 wherein the policy compliance engine comprises a circuit in an ASIC.

43. The device for monitoring computer communications as in claim 40 wherein the policy compliance engine comprises a policy compliance program running on a processor.

44. A computer program product for monitoring computer communications, the computer program product being embodied in a non-transitory computer readable storage medium and comprising computer instructions for:
   receiving at a first node the contents of a packet sent from a second node to a third node;
   determining whether an encryption policy applies to a packet sent from the second node to the third node based at least in part on packet header information in the packet;
   determining whether the packet includes a type of content for which the encryption policy requires that the content be encrypted or if the encryption policy does not require that the content be encrypted;
   determining whether the packet satisfies an encryption policy by determining whether an encryption policy applies to packets sent from a class of sources of which the second node is a member to a class of destinations of which the third node is a member;
   determining if the packet is encrypted, wherein determining if the packet is encrypted comprises performing an entropy-based statistical analysis of the packet; and
   generating a report indicating whether the encrypted or not encrypted status of the packet satisfies the encryption policy.

* * * * *